March 5, 1974  V. I. HORN ET AL  3,795,559

AIRCRAFT FLUTED CORE RADOME AND METHOD FOR MAKING THE SAME

Filed Oct. 1, 1971  2 Sheets-Sheet 1

March 5, 1974  V. I. HORN ET AL  3,795,559
AIRCRAFT FLUTED CORE RADOME AND METHOD FOR MAKING THE SAME
Filed Oct. 1, 1971  2 Sheets-Sheet 2

United States Patent Office 3,795,559
Patented Mar. 5, 1974

3,795,559
AIRCRAFT FLUTED CORE RADOME AND
METHOD FOR MAKING THE SAME
Victor I. Horn, Bellevue, and Henry A. Kangas, Renton, Wash., assignors to The Boeing Company, Seattle, Wash.
Filed Oct. 1, 1971, Ser. No. 185,491
Int. Cl. B31c 13/00; B65h 81/00; B64c 1/10
U.S. Cl. 156—152                                            7 Claims

ABSTRACT OF THE DISCLOSURE

A complex contoured fluted core radome structure for aircraft utilizing a relatively high temperature and high pressure cure cycle for laminated fiber material. The method further includes the utilization of removable and reusable flexible silicone rubber mandrels adaptable to complex contour configurations. The use of the flexible silicone rubber mandrels permits the use of high curing pressures to completely and uniformly fill the flutes of the fluted core panel structure and produce a structural product with very low void content which is necessary for meeting the radar electrical requirements combined with improved mechanical properties for the structural requirements.

BACKGROUND OF INVENTION

(1) Field of the invention

The invention relates generally to a laminated fluted core structure of the superior characteristics necessary for use as an aircraft radome structure and the method for producing the complex surface contour using a heat resistant flexible material for the mandrels that is substantially crush resistant at the forming pressures produced by a positive pressure of between 20 to 200 p.s.i. for periods between a half of an hour to four hours and at temperatures between 250 to 600 degrees F. The temperature, pressure and cure times are dependent upon the type of resin used, such as, polyester, epoxy, phenolic, silicone, polyimide and occasionally melamine. The resins and their cure cycle are as follows: polyester, 180–270 degrees F., 20–50 p.s.i., 60–90 minutes; epoxy, 225–350 degrees F., 40–100 p.s.i., 90–120 minutes; phenolics, 250–400 degrees F., 50–100 p.s.i., 120–210 minutes; silicones, 300–500 degrees F., 100–200 p.s.i., 3–5 hours; polyimides, 300–500 degrees F., 100–250 p.s.i., 4–6 hours; melamine, 325–600 degrees F., 200–300 p.s.i., 3–5 hours. Also, the fluted core fiber structure or the fluted core reinforcement material would to some extent determine the compatible resin, for example, where materials such as glass, quartz, hi-modulus carbon graphite, boron or other metallic fiber materials are used as compatible resin would also be selected for the intended purpose.

The mandrels for producing the fluted core glass fiber structure of the present invention generally are of triangular or rectangular cross-section and are mechanically removable after the heat and pressure cure cycle.

(2) Description of the prior art

A known method for fabricating the laminated, fluted core structure is the so-called Lost Wax method. This method utilizes extruded wax mandrels that are wrapped with a glass fiber fabric and resin impregnated by a hand or dip process with a polyester or epoxy resin and then placed directly into a curing mold. This method is limited to a relatively low temperature resin gelation below 160 degrees F. and vacuum bag curing at pressures between 10 to 14 p.s.i., due to the softening of the wax. The wax mandrels are removed during the heat cure cycle by vaporation, but a residual of wax contaminants is left in the flutes and the fiber material. The completed cured, fluted structure is of a low quality including a high void content due to inadequate pressure during cure and with a high degree of weight variance from part to part. Contamination of the wax residue can be a major cause of delamination and the non-adherence of paint. During the final cure cycle the vaporization of the wax permeates through the fluted core material and the skin plies which results in poor paint adhesion and part delamination in the Lost Wax method. The wax permeation and high void content in the surface or skin plies of the aircraft radome results in the rapid erosion of any paint or protective coating applied thereto by small particles of material or rain impacting on the relatively hard surface, and requires constant maintenance, extensive sealing and the use of rubber rain and particle erosion boots or coatings. The residual of wax contaminates that are left during the melt out or vaporization process, contributes to the pick up of additional contaminates which results in the deterioration of the structure and obnoxious odors. With the Lost Wax method, a minimum of pressure is provided on the flute walls and contributes to the lowered mechanical properties.

Another known method which is similar to the Lost Wax method, utilizes rigid mandrels of solid Teflon, nylon, etc., for making parts of a flat or slight contour. This is a commonly used method for woven and sewn radome configurations. This method does, however, allow the use of augmented curing pressure unlike the lost wax process. The problems with this method is the lack of side pressure on the flute and the difficulty of mandrel removal.

SUMMARY OF THE INVENTION

The invention relates to an aircraft radome structure and the production method utilizing a fiber resin matrix material laminated into a fluted core structure, which is made to conform to the complex surface contour required for radome structure and for consistently producing the desired transmissive electrical energy characteristics. More particularly, the invention relates to the method of fabricating contoured panel structures of fiber resin matrix material having a fluted core construction, utilizing a hollow mandrel of silicone rubber. Silicone has a built in release in that it doesn't stick to the completed structure. The cured silicone rubber mandrel will not adhere to any of the resin compositions previously mentioned herein. During the curing process to prevent crushing, the hollow mandrels are supported by flexible cables inserted into the elliptical hole in the mandrel. After the curing process is completed, the removal of the hollow mandrels is accomplished by removing the flexible cable and then pulling it out of the completed structure. As a further aid in the removal of the mandrels after the flexible cable is pulled out, the walls of the mandrel could be collapsed by applying a vacuum to the hollow core while simultaneously applying a gradually increasing tension to remove the mandrel. It is easy enough to lay up a laminated fiber radome structure with mandrels and then cure it, the difficulty is in removing the mandrels without leaving parts of the mandrels or a contaminating residue or damaging the completed structure thereby affecting the radar transmissiveness and altering its electrical or mechanical characteristics. Since most of the aircraft nose radomes for aerodynamic reasons are ogive or needle pointed removal of the mandrels around the crest of the curve is almost impossible without leaving parts of the mandrels in the structure. Therefore, by making the mandrels in two sections which are joined at the crest of the curve in the radome structure, the resistance that the curved or crest section would present if the mandrels were one piece and pulled from one end is eliminated with the split mandrel because they can be pulled from both ends and separate at their adhesive or mechanical abutment joint at the crest of the radome. The mechanical juncture could be made by a tubular insert that would mechanically join the two halves of the hollow mandrels if they were used for lay up without the insertion of cables, otherwise they are held together by the surface tension of the cables which is generally sufficient for lay up purposes. The present method permits the use of high temperature type resins as previously mentioned in combination with autoclave curing at high pressures which produces a high quality laminate structure with low void content. In the lay up process for making the radome structure, the mandrels are wrapped with a resin pre-impregnated fiber material rather than the wet lay up method used in the prior art Lost Wax method. Further through the use of a hollow mandrel as opposed to a solid mandrel, the expansion ratio characteristics are more readily controllable to a predictable rate which improves the dimensional control of the completed structure. The thermal expansion characteristics of silicone elastomers which are used for the mandrels is utilized in the thermal curing cycle for compacting and knitting the fibers of the material together thereby fabricating a denser fiber matrix structural material than could possibly be done by the Lost Wax method.

One of the main advantages of using fluted core radomes over honeycomb core structures, is that water permeates through the skin plies into the interior of the panel and also due to condensation, water is trapped in the honeycomb cells until the panel becomes water logged, and as a result causes a false image on the radar screen which could be extremely hazardous during inclement weather or instrument flight conditions. Further, when the water trapped in the honeycomb cells freezes, and the radome structure becomes damaged also resulting in false images. Whereas, with the fluted core structure, the water can drain out through the flutes into the water collection channel from which it is through drain holes by gravity or through a pressure release valve if the radome is under a pressurized environmental control system. For a more efficient operation of the radar equipment, a fluted core structure can be used to maintain the radar equipment at a constant temperature and humidity environment condition by ducting heated or cooled air through the flutes. Also, by ducting with heated air, ice will not be permitted to build up on the radome surface or on the radar equipment in the interior thereof.

Another advantage from a process standpoint is that the present invention permits the use of resin preimpregnated fiber material whereas, with the Lost Wax process, a wet layup method has to be used because of the high heat and pressure required to properly form and cure the prepreg material.

Another advantage is that the use of preimpregnated materials with a controlled fiber to resin ratio as in the present invention, contributes to part reproducibility, predictable weight of the completed structure and improved part reliability.

Another advantage is that the mandrels, which are made out of silicone materials, are more readily adaptable to compound contour lay ups and high pressure autoclave curing whereas, the known fluted core radome fabrication which is accomplished by the Lost Wax method requires a wet lay up and a low pressure vacuum bag oven curing. The use of a higher pressure curing cycle, applies a greater and more uniform pressure to all surfaces which results in the fluted core structure having a relatively low void content with improved mechanical properties and predictable electrical characteristics.

DESCRIPTION OF THE PREFERRRED EMBODIMENTS

Figure 1:
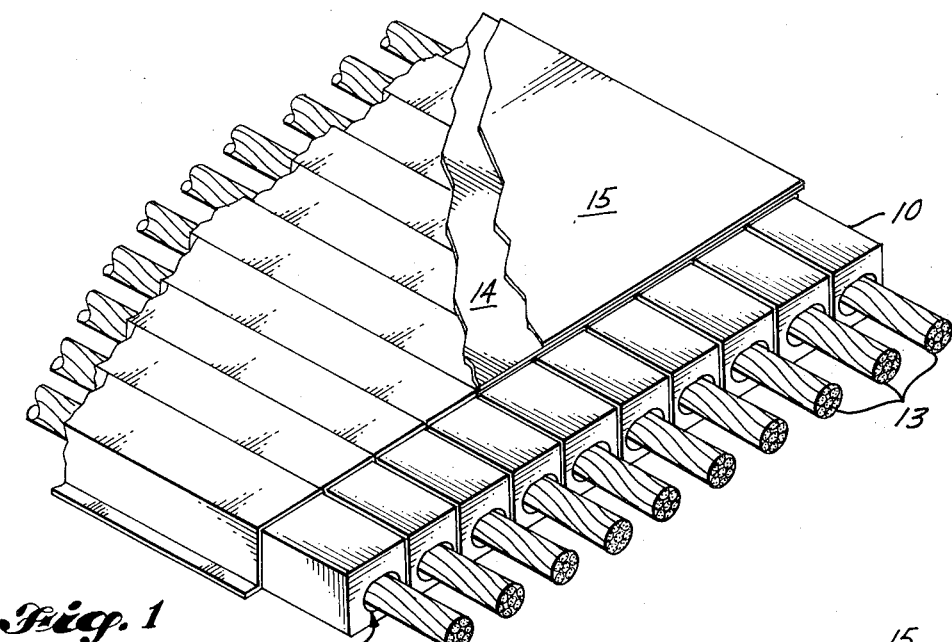
FIG. 1 is a perspective view of the fluted core lay up showing the parallel abutment arrangement of the flexible hollow core mandrels with their cable inserts for increasing their compressive resistance.

FIG. 1 shows the lay up method of the invention for fabricating fluted core radome structure, utilizing reusable silicone mandrels 10 which permit the use of prepregs and autoclave curing and results in a more uniform structure having higher mechanical properties with improved reproducibility characteristics.

The known Lost Wax method for the fabrication of fluted core structure is normally accomplished by spiral wrapping the wax mandrels with an unimpregnated resin glass fiber material, applying the liquid resin thereto and then making the lay up directly in a female curing mold.

Figure 2:
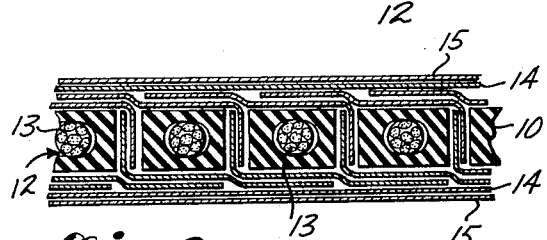
FIG. 2 is a cross-sectional view of a fluted core lay up with the mandrels and their cable inserts, depicting a non-preferred embodiment of the wrapping about the mandrels for fabrication of the fluted core.
Figure 4:
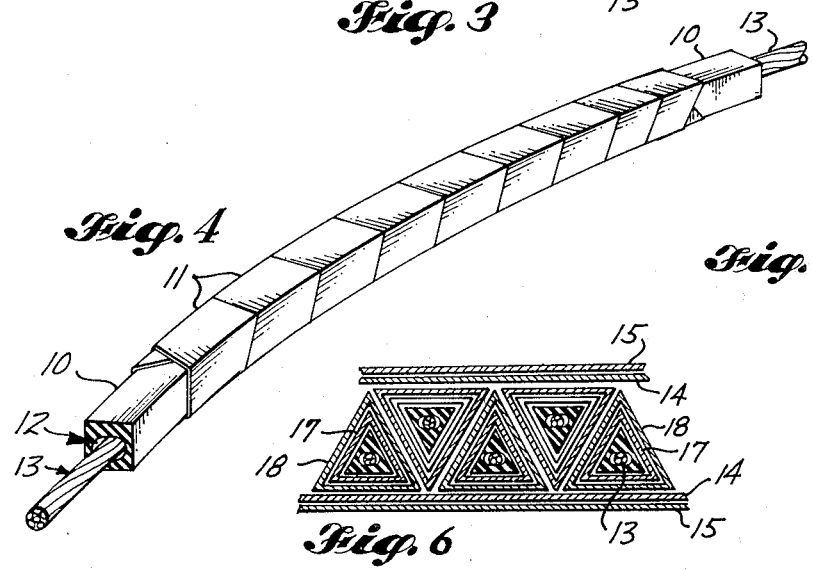
FIG. 4 is a perspective view of a spiral wrapped hollow core mandrel with the material wrapped on a forty-five degree bias with the edge of the material in abutment relation as opposed to an overlap relation and with a cable insert for increasing its compressive resistance.

This spiral wrapping procedure, as shown in FIG. 4, is more difficult with silicone rubber mandrels due to their greater flexibility. The glass fiber material 11 cannot be uniformly wrapped onto the flexible mandrel and results in an irregular lay up. In order to replace the prior art spiral wrapping procedure, many different wrapping and lay up techniques were investigated, e.g., the over and under lay up method shown in FIG. 2. The cross-sectional view shows the silicone rubber mandrels 10 having an elliptical opening 12 and the cables 13 inserted into the opening to increase compressive resistance and the over and under lay up of the material about the mandrels for fabrication of the fluted core and with the double, inner 14 and outer 15, skin plies. Upon visual examination of the completed structural panel, it was revealed that some of the flute walls were too thin at the area adjacent the skin. This thin flute wall was caused by improper trimming of the prepreg during lay up. This condition could not be satisfactorily corrected to assure a uniform wall thickness in a reasonable production period.

Figure 5:
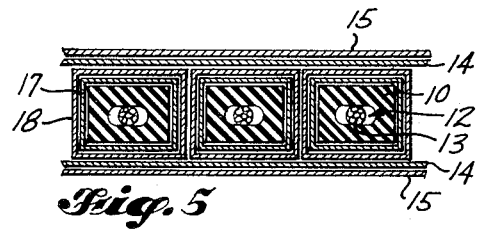
FIG. 5 is a cross-sectional view of a double wrapped spiral fluted core lay up, with the double skin plies, the hollow mandrels having an elliptical opening there through, and the cable inserted into the opening for depicting a preferred embodiment of the wrapping about the silicone rubber mandrels for fabrication of the fluted core panel structure.
Figure 3:
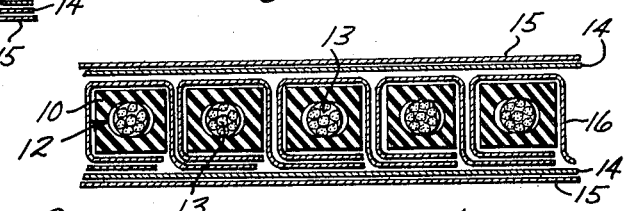
FIG. 3 is a cross-sectional view of a fluted core lay up with the mandrels and their cable inserts, depicting a preferred embodiment of the wrapping about the mandrels for fabrication of the fluted core.
Figure 6:
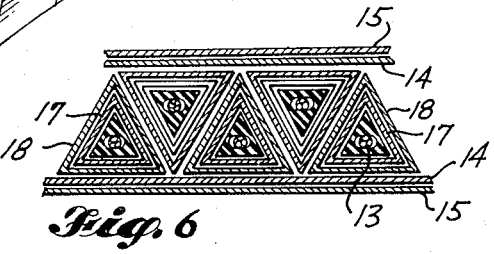
FIG. 6 is another embodiment showing a cross-sectional view of a double wrapped spiral fluted core lay up about a triangular silicone rubber mandrel having an elliptical opening there through for insertion of a cable to increase compressive resistance and with the double outer skin plies.

A satisfactory wrapped lay up procedure evolved which is shown in FIG. 3. The cross-section view shows the silicone rubber mandrels 10 having an elliptical opening 12 and the round cables 13 inserted into the openings and the core wrapping 16 with the double, inner 14 and outer 15, skin plies. FIG. 5 is a preferred embodiment of a double wrapped inner spiral wrap 17 and outer spiral wrap 18, hollow mandrel 10 wherein the material is wrapped on approximately a forty-five degree bias and with the edge of the wrapping in abutment relation as opposed to an overlap relation. The hollow mandrels 10 have an elliptical opening 12 therethrough for insertion of the cable 13 to increase the mandrel's compressive resistance. Also, in this embodiment, the web formed by the adjacent abutment relation of the mandrel lay up is composed of a four layer lamination which substantially adds to the aerodynamic impact loads that can be absorbed by this structure as opposed to that shown in FIG. 3 wherein the web comprises a two-ply lamination. FIG. 6 is another preferred embodiment which is a somewhat similar lay up to FIG. 5 except that a triangular mandrel is used. This structure is substantially superior in strength characteristics than either structures of FIGS. 3 or 5.

Figure 7:
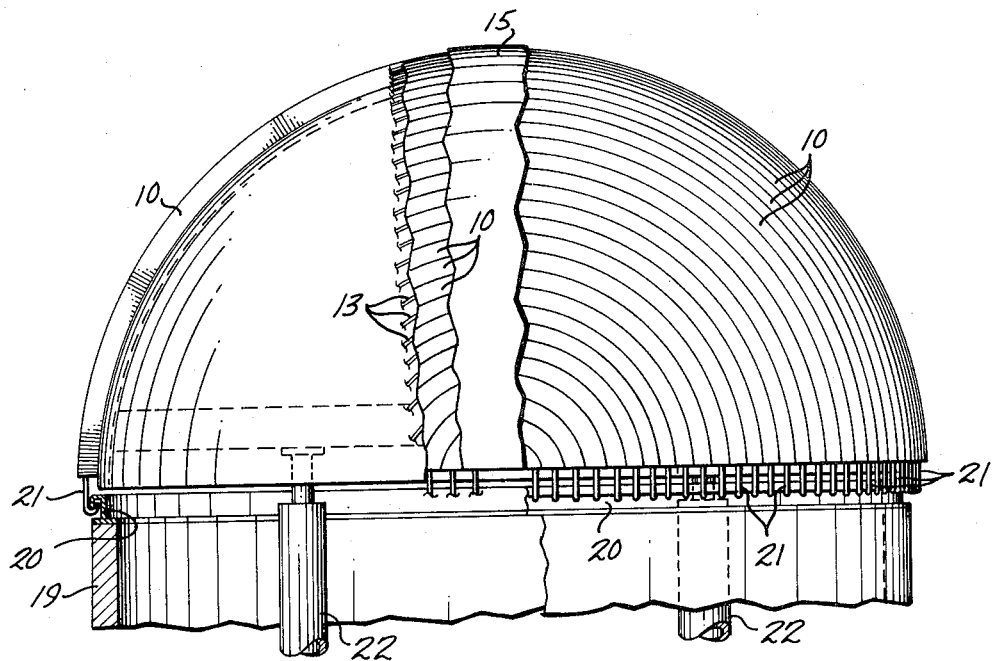
FIG. 7 is a perspective view of the spiral wrapped hollow core mandrels with hooks attached to their ends for connection to a stripper ring and their lay up onto the mail tool for the fluted core structure.
Figure 8:
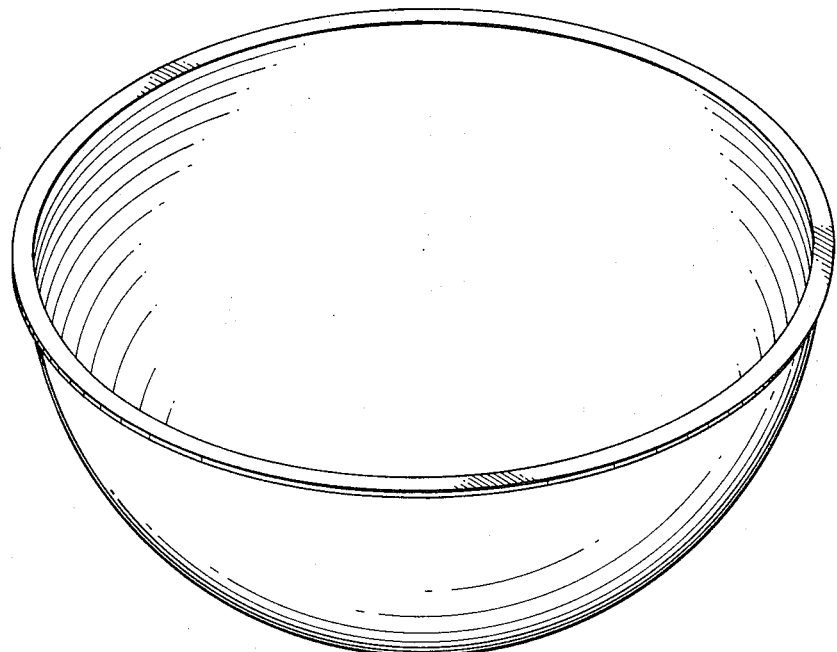
FIG. 8 is a perspective view of the female mold.

Lay up of radomes are normally accomplished in a female mold, as shown in FIG. 8, in order that the required degree of areodynamic contour and external surface smoothness is maintained. The lay up of fluted core structure in a female mold is very difficult because of the precise fabric placement requirement. Also, there is the problem of contamination from things dropping into the mold and personnel fatigue from working over and inside of a large female mold which may be up to eight feet across in the case of the Boeing 747 airplane. To alleviate some of the problems encountered with the use of a female mold, a male tool as shown in FIG. 7 was developed and fabricated to the interior dimensions of the radome. The male lay up form or tool shown is of a semi-hemispherical shape having an external surface contoured to the desired internal surface contour of the fluted core radome panel structure. Since the nose radome of an aircraft is ogive or needle nosed as dictated by aerodynamic streamlining, the male and female form tools would have to be configured likewise. The form should also have guide lines and locating points on the form to assist in placement of the flutes. The male tool could be mounted on a support base 19 that has incorporated a ring 20 located on guide pins (not shown). The ring 20 could engage the hooks 21 attached to the ends of the silicone rubber mandrels and through actuation of a jack 22 interposed between the support base 19 and the male tool for relative movement therebetween, would cause the ring 20 to strip the mandrels from the contoured fluted core. The cables 13 inserted in the hollow mandrels could also have hooks attached to their ends and connected to the ring which would aid in locking the mandrels in position and keep them from slipping. A saddle might be required to strap the curved section to the form to prevent slippage. The saddle can be a heavy silicone rubber blanket which is employed to densify and compact the mandrel lay up at room temperature and under a vacuum pressure. One operating procedure for epoxy resin compacting would be to hold for one hour at room temperature at a minimum vacuum of 15 to 20 inches of mercury. The method is to accomplish the lay up on a male tool and upon completion of the lay up, the entire lay up is transferred into the female mold for curing. The transfer of the lay up is accomplished by locating the female mold onto the completed lay up of the male tool and securing it in place. Both are then turned over and the male tool removed out of the female mold. To permit removal of the male tool, it is covered with a caul sheet of fiber laminate material. The caul sheet is held in place on the male tool by suitable means such as masking tape and the fluted core lay up is made upon the caul sheet. In removing the male tool, the masking tape is removed from the caul sheet and the male tool lifted out of the female mold, leaving the caul sheet and fluted lay up in position in the female mold. The caul sheet is left on the lay up during cure to provide a smooth interior surface and to control thickness tolerance. This transfer technique of the lay up works satisfactorily and can be accomplished without shifting or distorting the fluted lay up.

The mandrels should be made of a high tear, high tensile, silicone rubber. A mandrel found to be satisfactory has the following characteristics; a temperature range of 65–450 degrees F., tensile strength of 1200 p.s.i., elongation 500 percent; and a shore "D" hardness of 50±5. As shown in FIG. 4, one type of mandrel could be extruded into a square cross-section of approximately ½" x ½", with an elliptical hole throughout the length. A small diameter cable 13 similar to DX cable can be inserted into the elliptical hole through the extrusion to offer support and to conform the mandrel to the desired contour of the radome without springback.

Another type of mandrel could be of a low durometer silicone rubber extruded into a hollow round or cylindrical shape that would permit the glass fiber sheet material to be rolled onto the mandrel either manually on a rolling table or mechanically through the use of a machine. This configuration would have to be finited to allow the mandrels to deform and flatten to a triangular or rectangular configuration for the fluted core structure upon the application of minimum molding pressures.

Removal of the silicone rubber mandrels after cure from flat panels presents no problems in lengths up to eight feet. The mandrels are pulled with a continual increase in tension from one end and as they elongate they reduce in cross-section and are easily removed. However, mandrel removal from compound contour shape such as an aircraft nose radome which is sometimes needle nose in shape, is much more difficult since a surface resistance develops between the mandrel and the compound contour of the flute walls. To ease removal of the mandrels, each length of mandrel is cut in two approximately in the middle and the two lengths rejoined by mechanical juncture or adhesive bonding. The bond joint should have enough integrity to hold during the lay up and processing procedures but must be able to separate with a predetermined tensile load. When the mandrels are pulled by their ends, they elongate and separate at their juncture and are removed from the interior of the flutes in two pieces. In determining the proper techniques for mandrel removal several mandrels were broken off in the radome when they were released by the operator before complete removal. When released, the sharp edge of the cured glass fiber laminate could cut the silicone mandrel and subsequent pulling can cause rupture at the location of the cut. Therefore, proper removal requires a continual pulling or tension on the mandrel until it breaks loose and is removed. To provide sufficient gripping length during removal, the mandrel should extend approximately six inches beyond the length of the flute lay up. Also, the arrangement shown in FIG. 7 can be used wherein a stripper ring engages the hooks attached to the ends of the mandrels and upon movement of the stripper ring relative to the male form tool through the interconnecting jack 22 or actuation means, the mandrels are uniformly pulled from the periphery of the radome structure.

It is not sufficient that the contoured panels be structurally satisfactory, they must also meet specified electrical performance requirements. To determine the electrical properties of the fluted core radome structure, several flat panels were fabricated to the electrical engineering requirements of the Boeing 747 airplane, X-band radar enclosure structure. The panels were approximately 4'×4½' in size, with a flute width of ½ inch. The panels were fabricated from a pre-impregnated epoxy glass fiber material and cured at 260° F. with a positive pressure of 40 p.s.i. The completed phenols were tested by the electrical engineering group and verified that the actually measured electrical characteristics matched those calculated. The panels were measured for transmission efficiency which was within 2 to 3 percent and their Insertion Phase Difference (IPD) which was within 4 degrees of the calculated performance parameters. Whereas, with the Lost Wax process using the wet lay up method, the fluted core transmission efficiency is from 4–8 percent and the IPD within the range of 9 degrees. The desired total thickness was obtained with a tolerance of ±0.02 inch.

Figure 9:
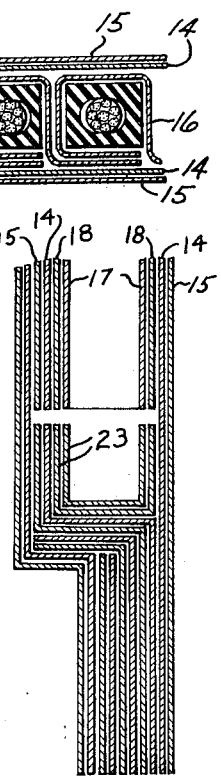
FIG. 9 is a sectional view taken lengthwise through a fluted core section at the outer rim showing the installation of the water collection channel and the laminated build up of the radome edge band for structural attachment to the aircraft.

In general, the method for fabricating fluted core structure of a compound contour such as an aircraft nose radome is done in substantially the following manner: (1) A caul sheet of fabric material is positioned onto the male lay up tool shown in FIG. 7, which is sized to the inside mold line of the radome structure to be fabricated, and the caul sheet is taped or fastened in position. (2) A parting agent coating is then applied to the caul sheet. (3) A first sheet or ply of prepreg or resin impregnated fabric material is then laid onto the caul sheet. (4) A second sheet or ply of prepreg or resin impregnated fabric material is then placed onto the first sheet for the double ply skin lay up of one side of the panel structure. (5) A center line for the radome is established for placement of the first mandrel of the fluted core structure. Since lines placed on the surface of the male tool would be visible through the sheets placed thereon due to their translucency, the complete surface of the male tool can be lined to a predetermined arrangement. (6) For the lay up shown in FIG. 3: a predetermines width of prepreg strip is positioned on the center line. The strip of prepreg is then wrapped around a mandrel in the manner shown with the excess lying adjacent the mandrel. Then another mandrel is placed adjacent to the first mandrel and used as a guide for marking and trimming the excess material lying adjacent the first mandrel with a seam ripper. Position another predetermined width of prepreg strip onto the marked and trimmed portion adjacent to the first wrapped mandrel and then place the second mandrel onto the two layers of fluted core prepreg and in adjacent abutment to said previously wrapped mandrel. Wrap the second mandrel with the remaining width of the strip of prepreg. (7) For the lay up shown in FIGS. 5 and 6, a double wrapping is applied to the mandrels with the material wrapped on approximately a forty-five degree bias with the wrapping edges thereof in abutment relation as opposed to an overlapping arrangement. The mandrels are then placed adjacent to each other in the manner shown in the FIGS. 5 and 6. (8) Repeat or continue positioning the mandrels adjacent to each other down each side of the male tool from the center line outward, until the mandrel lay up is completed. (9) Enclose the mandrel lay up with a vacuum bag and with a partial vacuum of approximately 15 inches of mercury at room temperature and maintain this for approximately a half of an hour. This compacts the lay up so that the fluted structure will adhere together and not move during the transfer to the female curing mold. (10) Remove the vacuum and the bag and apply the remaining skin plies. (11) Apply a parting agent to the inner surface of the female mold shown in FIG. 8. The inner surface of the mold should conform to the outer mean line or external surface of the radome. (12) If extensive porosity exists the following additional steps can be used: position a one-ply sheet of resin impregnated Dacron veil in the female mold so that the Dacron surface is against the inner surface of the mold. Then lay up two plies of prepreg overlapping or butting where necessary. Work the material down tight into the female mold inner surface. (13) Place the female mold onto the completed and compacted mandrel lay up on the male tool and secure the female mold in position. (14) Turn both the female mold and the male tool over so that the female mold is now on the bottom with its inner mold surface pointing upward as shown in FIG. 8. (15) Remove the masking tape or the fastening means holding the caul sheet onto the male tool. (16) Lift the male tool from the female mold leaving the completed lay up in the female mold. (17) Enclose the completed lay up of the female mold in a vacuum bag. (18) Place the vacuum bagged lay up and mold into an air heated autoclave and cure as follows: (a) apply pressure until the autoclave pressure reaches 30 p.s.i., then vent the part to atmosphere. This venting eliminates back pressure, reduces vacuum bag failure, and insures a low void content and bubble free part; (b) start the cure cycle at 100–180 degrees F., and hold for one hour until the mold and laminate reach temperature. This permits the preimpregnated material to flow and induces intimate contact between the flutes and results in high densification of the fibers permitting them to nest or knit together; (c) the final cure cycle is then applied at the optimum pressure and temperatures dependent on the particular type of resin system utilized as previously stated herein. (19) Allow the cured lay up to cool to room temperature, under pressure in the autoclave, then remove it from the autoclave and remove the vacuum bag. (20) Remove the completed radome lay up from the female mold and place it onto the male tool. (21) Remove the DX cable from the center of the mandrels. (22) Attach the ends of the mandrels to the stripper ring and gently apply pressure to the stripper ring until the mandrels are removed. The silicone rubber mandrels are removed from the lay up by gently pulling with an increased tension on the mandrels from each end and continuously applying the tension until the adhesive bond or mechanical connection at their split juncture ruptures thereby, removing the mandrels in two pieces. (23) Trim the inner periphery of the part including the ends of the fluted core leaving the outer double skin ply intact. This can be done with a traveling router while the part is positioned in the female mold. (24) Install a double laminated U-type moisture collection channel 23 as shown in FIG. 9, and build up the edge band with additional laminations as shown for the structural fastening to the aircraft. The annular channel 23 is positioned with respect to the fluted core so as to collect the moisture drainage from all of the fluted cores. The installation of the edge band and moisture collection channel is done with the part positioned in the female mold. (25) For curing the lay up of the moisture collection channel 23 and the laminate reinforced edge band, the completed lay up is covered with two plies of breather and then enclosed in a vacuum bag. The assembly is heat and pressure cured for a period of time as previously stated for curing of the fluted core section. (26) The completed radome is then allowed to cool to room temperature under pressure and then removed from the female mold. (27) All surface voids on the outer skin of the completed radome are filled and sanded until a smooth surface is obtained.

It will be understood that the structure and method of this invention can be modified to various highly contoured configurations and the procedures altered to increase productivity, and it is accordingly desired to comprehend within the purview of this invention such modifications as may be considered to fall within the scope of the appended claims.

What is claimed is:

1. In the method for fabricating a laminated fluted core structure using mandrels for forming the fluted core, wherein the improvement comprises:
   (a) cutting a hollow mandrel of flexible silicone rubber into approximately two equal lengths;
   (b) joining the two lengths in abutment relation to reform it into a continuous length;
   (c) wrapping a resin impregnated fiber material around the mandrel for forming the fluted core;
   (d) curing the material using augmented pressure and heat to form the integral fluted core structure;

(e) withdrawing the mandrel from the core by pulling on the ends of the mandrel slowly with increasing tension so as to cause it to contract in cross-section until the split juncture ruptures thereby removing the mandrel in two pieces.

2. In the method for fabricating fluted core structure using mandrels for forming the fluted core, wherein the improvement comprises:
   (a) cutting a hollow mandrel of flexible silicone rubber into approximately two equal lengths;
   (b) adhesively bonding the two lengths together thereby reforming a continuous length;
   (c) wrapping the fluted core resin material around the mandrel leaving sufficient length extending outside of the core for gripping during removal of the mandrel from the core;
   (d) curing the material to form the integral fluted core structure;
   (e) withdrawing the flexible mandrel from the core by simultaneously pulling the ends of the mandrel slowly with increasing tension so as to cause it to contract in cross-section until the bond at the split juncture ruptures thereby removing the mandrel in two pieces.

3. In the method for fabricating a laminated fluted core structure using mandrels for forming the fluted core, wherein the improvement comprises:
   (a) cutting a hollow mandrel of flexible silicone rubber into approximately two equal lengths;
   (b) inserting a cable lengthwise through the two lengths of mandrel joining them together in abutment relation and for increasing the compressive resistance of the mandrel;
   (c) wrapping a resin impregnated fiber material around the mandrel for forming the fluted core;
   (d) curing the material using augmented pressure and heat to form the integral fluted core structure;
   (e) removing the cable from the joined mandrel; and
   (f) withdrawing the mandrel from the core by pulling on the ends of the mandrel slowly with increasing tension so as to cause it to contract in cross-section until the mandrel is removed in two pieces.

4. A method for fabricating a fluted core structure of a compound contour radome, comprising the steps of:
   (a) positioning a first plurality of resin-impregnated fabric material onto a male tool to provide for the skin ply of the interior side of the radome structure;
   (b) wrapping some resin-impregnated fabric material around a flexible silicone rubber mandrel for forming the fluted core;
   (c) positioning the mandrel onto the male tool;
   (d) positioning other wrapped mandrels onto the male tool adjacent to those previously positioned until the fluted core layup is completed;
   (e) positioning a second plurality of resin-impregnated fabric material over the mandrel layup to provide for the skin ply of the exterior side of the radome structure;
   (f) placing a female mold onto the completed layup on the male tool and secure them in position;
   (g) turning both the female mold and the male tool over so that the female mold is now on the bottom with its inner mold surface pointing upward;
   (h) lifting the male tool from the female mold leaving the completed layup in the female mold;
   (i) curing the resin by simultaneously applying heat between 100–500 degrees F., for a half to four hours and pressure between 20–200 p.s.i., to form the integral fluted core structure;
   (j) cooling the cured layup under pressure until the thermoplastic point of the material has been reached;
   (k) removing the completed fluted core structure from the female mold;
   (l) placing it onto the male tool; and
   (m) removing the silicone rubber mandrels from the completed fluted core structure by pulling gently with increasing tension on the mandrels.

5. A method for fabricating a fluted core structure of a compound contour radome, comprising the steps of:
   (a) positioning a first plurality of sheets of resin-impregnated fabric material onto a male tool to provide for the skin ply of the interior side of the radome structure;
   (b) positioning a flexible silicone rubber mandrel onto the male tool;
   (c) wrapping some resin-impregnated fabric material around the mandrel for forming the fluted core;
   (d) positioning a second mandrel onto the male tool adjacent to the previously positioned mandrel;
   (e) wrapping some resin-impregnated fabric material around the second mandrel;
   (f) positioning and wrapping additional mandrels onto the male tool adjacent to those previously positioned until the fluted core layup is completed;
   (g) positioning a second plurality of sheets of resin-impregnated fabric material over the mandrel layup to provide for the skin ply of the exterior side of the radome structure;
   (h) placing a female mold onto the completed layup on the male tool and secure them in position;
   (i) turning both the female mold and the male tool over so that the female mold is now on the bottom with its inner mold surface pointing upward;
   (j) lifting the male tool from the female mold leaving the completed layup in the female mold;
   (k) curing the resin by simultaneously applying heat at a temperature between 100–500 degrees F., for a half to four hours and pressure of between 20–200 p.s.i., to form the integral fluted core structure;
   (l) cooling the cured layup under pressure; and
   (m) removing the mandrels from the completed fluted core structure by pulling gently with increasing tension on the mandrels.

6. A method for fabricating a fluted core structure of a compound contour for an aircraft nose radome, comprising the steps of:
   (a) positioning a first plurality of resin-impregnated fabric material onto a male tool sized to the inside mold line of the radome structure being fabricated to provide for the skin ply of the interior side of the radome structure;
   (b) cutting a flexible silicone rubber mandrel into two lengths;
   (c) bonding the two lengths in abutment relation;
   (d) wrapping some resin-impregnated fabric material around the joined mandrel for forming the fluted core;
   (e) positioning the joined mandrel onto the male tool so that the bonded joint is at the crest of the curve of the aircraft nose radome structure;
   (f) positioning other wrapped mandrels onto the male tool adjacent to those previously positioned until the fluted core layup is completed;
   (g) positioning a second plurality of resin-impregnated fabric material over the mandrel layup to provide for the skin ply of the exterior side of the radome structure;
   (h) placing a female mold sized to the external contour of the radome structure being fabricated onto the completed layup on the male tool and secure them in position;
   (i) turning both the female mold and the male tool over so that the female mold is now on the bottom with its inner mold surface pointing upward;
   (j) lifting the male tool from the female mold leaving the completed layup in the female mold;
   (k) placing a pressure bag over the completed layup in the female mold;

(l) curing the resin by simultaneously applying heat and curing pressure of a minimum of twenty inches of mercury to form the integral fluted core structure;
(m) cooling the cured layup under pressure;
(n) removing the completed fluted core structure from the female mold;
(o) placing it onto the male tool; and
(p) removing the silicone rubber mandrels from the completed fluted core structure by pulling gently with increasing tension on the mandrels from each end until the bond at their split juncture ruptures thereby removing the mandrels in two pieces.

7. The method as recited in claim 6 further including after Step (c):
inserting a cable lengthwise through the joined mandrel for increasing the compressive resistance of the flexible silicone rubber mandrel; and after Step (o) removing the cables from the joined mandrels.

References Cited

UNITED STATES PATENTS

| | | | |
|---|---|---|---|
| 2,755,216 | 7/1956 | Lemons | 156—187 X |
| 2,739,350 | 5/1956 | Lampman | 156—173 X |
| 2,868,269 | 1/1959 | Letteron | 156—184 |
| 3,567,504 | 3/1971 | Hopkins et al. | 156—184 X |
| 3,629,030 | 12/1971 | Ash | 156—184 X |

ALFRED L. LEAVITT, Primary Examiner

B. J. LEWRIS, Assistant Examiner

U.S. Cl. X.R.

156—159, 173, 184, 191, 245, 258, 304; 244—121; 264—313, 331